(12) United States Patent
Brickwedde et al.

(10) Patent No.: US 11,086,323 B2
(45) Date of Patent: Aug. 10, 2021

(54) METHOD FOR DETERMINING THE ACCURACY OF FOLLOWING A TRAJECTORY

(71) Applicant: Robert Bosch GmbH, Stuttgart (DE)

(72) Inventors: Alexander Brickwedde, Herrenberg (DE); Jattin Sangwan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 16/384,356

(22) Filed: Apr. 15, 2019

(65) Prior Publication Data

US 2019/0346846 A1 Nov. 14, 2019

(30) Foreign Application Priority Data

May 8, 2018 (DE) ...................... 10 2018 207 102.0

(51) Int. Cl.
*G05D 1/00* (2006.01)
*G05D 1/02* (2020.01)

(52) U.S. Cl.
CPC ......... *G05D 1/0088* (2013.01); *G05D 1/0221* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 9,645,577 B1 * | 5/2017 | Frazzoli | .......... | B60W 30/18163 |
| 9,727,034 B1 * | 8/2017 | Ross | .................... | G05B 13/024 |
| 2017/0031361 A1 * | 2/2017 | Olson | .................... | G08G 1/167 |
| 2018/0284785 A1 * | 10/2018 | Berntorp | .............. | G08G 1/0112 |
| 2019/0243371 A1 * | 8/2019 | Nister | .................. | G05D 1/0231 |

FOREIGN PATENT DOCUMENTS

| | | | | |
|---|---|---|---|---|
| DE | 102013225057 A1 * | 6/2015 | ......... | B62D 15/0265 |
| DE | 10 2015 200 926 A1 | 7/2016 | | |
| EP | 3 016 827 B1 | 5/2016 | | |

* cited by examiner

*Primary Examiner* — Kelly D Williams
(74) *Attorney, Agent, or Firm* — Maginot, Moore & Beck LLP

(57) ABSTRACT

A method for determining the accuracy with which a vehicle can drive along a prescribed intended trajectory is disclosed. The physical state of the vehicle is represented by a state tensor, the uncertainty of which is known at an initial point in time in the form of a covariance tensor. A continued temporal development of the state tensor is modeled through the application of a first operator, which represents the dynamic behavior of the vehicle, to a combination of the state tensor and the prescribed intended trajectory, and through the subsequent application of a second operator, which represents external perturbations. Through a covariance propagation with the first and second operators, a continued temporal development of the covariance tensor is determined. A future accuracy with which the prescribed intended trajectory can be driven along is determined from the continued temporal development.

15 Claims, 4 Drawing Sheets

METHOD FOR DETERMINING THE ACCURACY OF FOLLOWING A TRAJECTORY

This application claims priority under 35 U.S.C. § 119 to application no. DE 10 2018 207 102.0, filed on May 8, 2018 in Germany, the disclosure of which is incorporated herein by reference in its entirety.

TECHNICAL FIELD

The present disclosure relates to the determination of the accuracy with which a given vehicle can drive along a prescribed intended trajectory taking its design properties, its current state and external perturbations into account.

BACKGROUND

A vehicle that drives at least partially automatically captures its surroundings with a physical sensor system and interprets these surroundings in accordance with the applicable traffic rules. The vehicle then plans an intended trajectory that leads to the desired driving destination and that takes further wishes or boundary conditions into account. These wishes can, for example, relate to a shortest possible driving time, a lowest possible fuel consumption, or a greatest possible driving comfort. Generally speaking, however, the boundary condition with the highest priority is that of minimizing the risk of collision, or the collision freedom, of the chosen trajectory.

A method for planning a trajectory that determines the minimum and maximum outlines of objects in the surroundings of the vehicle and reduces the assumed outlines of objects in steps, starting from the maximum outlines, until a collision-free trajectory is found, is known from DE 10 2015 200 926 A1.

A further method for planning trajectories is known from EP 3 016 827 B1. In addition to a trajectory for normal operation, a safety trajectory is also planned for the event that, as a result of a technical failure, the automatic driving mode cannot be ensured, and that the vehicle must be safely halted as quickly as possible.

SUMMARY

A method for determining the accuracy with which a vehicle can drive along a prescribed intended trajectory y is developed within the framework of the disclosure.

This accuracy can here, in particular, be defined as a probability of presence. This clearly means that if, for example, a vehicle that drives at least partially automatically drives along an unchanging intended trajectory n times (where n is an integer), a slightly different actual trajectory will be driven along each time. The desired representation of the accuracy results as the probability of presence along the intended trajectory for n→∞. A scalar value for an accuracy can therefore be defined and understood in particular as a parameter or another description for a probability distribution. A low accuracy can here, for example, correspond to a higher variance, and conversely a higher accuracy to a lower variance.

The method assumes that the physical state of the vehicle is represented by a state tensor X, which means that the state tensor X contains a set of magnitudes that is sufficient to describe the physical state of the vehicle at least as fully as is qualitatively and quantitatively relevant for the determination of the desired accuracy. This is, for example, the case with a general, technical, dynamic system, when the state tensor physically describes the energy content of the energy stores contained in the system. It is further assumed that the uncertainty of the state tensor X is known in the form of a covariance tensor P at an initial time point. The covariance tensor P thus indicates the extent to which the components of the state tensor X are distributed as random variables around respective nominal values, wherein this distribution is not restricted to a normal distribution.

The continued temporal development of the state tensor X is modeled through the application of a first operator F, which represents the dynamic behavior of the vehicle, to a combination of the state tensor X and the prescribed intended trajectory y, as well as through the subsequent application of a second operator W, which represents external perturbations, to the result. This modeling can take place at discrete times with a prescribed sampling rate, but can also be continuous.

The operator F thus describes in summary form how the vehicle changes its physical state when it is in a specific physical state X and at the same time should follow the intended trajectory y. It is, for example, possible that at a certain point in time, starting from travel in a straight line, the intended trajectory y prescribes a lane change to a neighboring lane. The operator F then describes in detail how, in the absence of external perturbations, this lane change proceeds kinematically, and contains the particular information relating to the vehicle itself that is relevant to this case. Thus the speed, for example, with which the actuators for changing the steering angle can be repositioned, is finite. The operator F further describes physical interactions depending, for example, on the mass distribution in the vehicle, in such a way that in the presence of a tight steering angle, not only is the direction of movement of the vehicle as a whole in the plane of the roads changed, but, amongst other things, a tilting torque is also exercised about the longitudinal axis of the vehicle. Boundary conditions can, for example, also be contained in the operator F in such a way that the adhesive friction of the tires transfers into sliding friction above a certain centrifugal force when driving in a curve, and this sliding friction then dominates the further kinematic behavior of the vehicle. In contrast, the operator W describes external influences such as, for example, a change in the gradient of the roadway, or force influences due to the wind.

A continued temporal development P* of the covariance tensor P is determined through a covariance propagation with the operators F and W. A future accuracy with which the prescribed intended trajectory y can be driven along is determined from the continued temporal development P*.

It has been recognized that the accuracy with which the vehicle can drive along the prescribed intended trajectory y is not a fixed magnitude, but depends heavily on the driving situation. The accuracy, for example, in the case of straight-line travel at a constant speed, in which only a few forces and torques act on the vehicle, is significantly better than when turning a tight corner or during braking maneuvers during which a large number of forces and torques are in effect. External perturbations, such as perhaps gusts of wind, can also affect the accuracy. The corresponding effect mechanisms that are held in the operators F and W relate to physical laws. For a given vehicle, and for reasonable assumptions about the surroundings in which this vehicle is operated, the operators F and W are thus available. The covariance propagation now enables, in a statistically driven manner, the determination of the unknown, future accuracy from the available information held in the operators F and W.

The determination of this future accuracy is not an end in itself, but has an effect on the planning of the trajectories for the at least partially automated driving. The accuracy can be used to minimize the risk of a collision or of some other kind of unsafe driving. If, for example, a nominal intended trajectory y is planned such that it leads along a steep drop without a crash barrier at a distance of 50 cm, a storm, embodied for example in the operator W, can have the effect that this intended trajectory y can only be driven with a low accuracy. This low accuracy leads to a non-negligible risk of falling into the depths. The travel must therefore be shifted until the storm has passed and the intended trajectory y can again be driven along with a greater accuracy, so that the risk of falling into the depths is again tolerable.

At the same time the dynamic determination of the accuracy enables greater freedom in the planning of trajectories. The bandwidth of possible accuracies is sufficiently large that a "worst-case" estimate, while it does ensure safety in all cases, however unnecessarily restricts the possible driving maneuvers in situations in which the available accuracy is good. Thus for example, in mixed traffic comprising vehicles that are driving with at least partial automation on the one hand and vehicles driven by human drivers on the other hand, it has an extremely disconcerting effect on a human driver if the automated vehicle in front just does not get out of the overtaking lane because the "worst-case" estimate prevents slotting into a gap between two vehicles in the right-hand lane that is in fact sufficiently large. For the passengers of the automatically driving vehicle it is in turn very inconvenient if the vehicle, perhaps before the destination at the nearest motorway exit, cannot get into the right-hand lane in good time. The vehicle must then drive on to the next exit and turn round there, which can entail a significant detour. Certain routes are also automatically excluded by such a procedure, since narrow passages cannot be passed.

In a discrete-time representation, for example, the state tensor $X_{k+1}$ at the time k+1 can emerge from the state tensor $X_k$ at time k in accordance with $$X_{k+1} = F[X_k, y_k, l_k] + W_k$$

where $y_k$ is the position at the time k aimed at by the intended trajectory y, and $W_k$ represents the influences of external perturbations, assumed to be purely additive, at the time k. $l_k$ here describes internal parameters of the operator F which can adapt the behavior of the operator F to parameter changes.

Advantageously the state tensor X contains the current position of the vehicle as well as a set of further magnitudes that represents a set of kinetic and potential energies linked to the dynamic behavior of the vehicle. Such magnitudes can, for example, comprise derivatives of the position. A kinetic energy is thus so to speak contained in a movement of the vehicle as a whole along a direction. Kinetic energy is, however, also contained for example in a tilting movement of the body of the vehicle around its longitudinal axis. When this tilting movement is caught by an elastic spring in the suspension, this kinetic energy is stored in the spring in the form of potential energy. When the cause for the tilting movement, such as traveling round a bend, has passed, the potential energy from the spring is again used to tilt the vehicle body back into the original position.

The set of kinetic and potential energies linked to the dynamic behavior of the vehicle advantageously contains all the kinetic and potential energies linked to the dynamic behavior of the vehicle. The state tensor X then describes the state of the vehicle completely. Such a complete description is, however, not entirely essential for the practical determination of the accuracy with which the prescribed intended trajectory can be driven along. There can, for example, be kinetic and potential energies whose quantitative contribution to the desired accuracy is negligible. Depending on the application, it is also possible to only search for the accuracy with reference to specific coordinate directions, so that it becomes unnecessary to consider energies that are only relevant in reference to other coordinate directions.

In a particularly advantageous embodiment, a vehicle is chosen that is fitted with a control loop for automatically driving along the prescribed intended trajectory y. The operator F is determined by modeling the behavior of the combination of the vehicle and the control loop. This can generally be referred to as a closed control loop.

Bringing together the vehicle and the control loop in the operator F leads to a realistic estimate of the accuracy with which the intended trajectory y can be driven along. Thus it may be that, in a specific vehicle, the manipulated variables on which the control loop has to act, and which magnitudes the control loop has to take from the vehicle as feedback, are not uniquely specified. There is, rather, a certain freedom of choice here. The choice, once made, then however specifies the possibilities the control loop has for intervention. The choice of the magnitudes chosen as feedback also has an effect on how quickly and with what gain factor a specific change in the dynamic behavior of the vehicle reaches the control loop as feedback. The type of controller itself also affects the dynamic behavior with which, starting from an initial point in time, the intended trajectory y is aimed at with a specific dynamic behavior of the vehicle.

If the physical and technical relationships in the vehicle and in the control loop are fully known ("white-box model"), the behavior of the combination of the vehicle and the control loop can then be described, possibly analytically or at least continuously in a non-linear state-space representation. The modeling is, however, not restricted to this, but is also possible if inputs are only applied to the overall system, and the associated outputs can be called up without having access to the internal relationships ("black-box model"). The modeling can, for example, contain a numerical approximation and/or the result of a parametric or non-parametric identification.

Particularly advantageously, the operator F additionally represents uncertainties and/or inaccuracies to which the modeling of the behavior is subject. The accuracy with which the prescribed intended trajectory y can be driven along that is determined then corresponds even better to the accuracy that can be achieved in reality. The uncertainties and/or inaccuracies of the model can, for example, result from simplifications that have been made in an analytical description or numerical approximation. Thus, for example, dynamic behaviors are usually only modeled up to a certain order, and higher orders remain out of consideration. The uncertainties and/or inaccuracies can also, however, be caused for example because certain magnitudes or characteristic curves used in the model are not known to an arbitrary degree of accuracy. Thus, for example, tire characteristics are strongly non-linear, and are also not constant. The determination of the position and the speed of the vehicle from the rotation speed of the wheels by means of odometry is subject to uncertainties. The centre of gravity and the moment of inertia of the vehicle with respect to specific axes can, furthermore, usually only be determined approximately with the available sensor system. These uncertainties can be taken into account in the internal relationship of the operator F.

In a further particularly advantageous embodiment, the actual behavior of the combination of the vehicle and the control loop on a plurality of vehicles is determined. The information related to this is brought together in order to determine a common operator F for the plurality of vehicles. The accuracy with which the operator F describes the real dynamic behavior of the vehicle can be improved in this way. The raw data from which F is determined can, for example, be output over a V2V (vehicle to vehicle) or V2I (vehicle to infrastructure) interface and collected on an external server where the operator F is finally determined out of the entire pool of data. This offers a further advantage that the computing capacity for the determination of the operator F does not have to be maintained in the vehicle itself.

In a further particularly advantageous embodiment, at least one physical state magnitude of the vehicle or at least one vehicle system, at least one physical state magnitude of the surroundings, and/or at least one usage indicator for the wear of at least one vehicle system or consumable material is captured with at least one sensor and incorporated in the operator F. Whereas identically manufactured vehicles when new can ideally be well-described by one and the same operator F, the conditions under which these vehicles are operated can differ markedly from one another. Through the use of the physical state magnitude, or of the usage indicator, the operator F can be adapted to the individual vehicle. Any degraded state of the vehicle can, in general, be taken into account in the operator F.

The weight and/or the spatial weight distribution of the vehicle, and/or at least one temperature, and/or at least one pressure can, for example, be used as a physical state magnitude. The weight is relevant to the inertia. The spatial weight distribution is relevant for moments of inertia in relation to specific axes and, for example, also for the tendency of the vehicle to tip over upon fast changes of direction. The rate at which the vehicle can accelerate can depend on whether the combustion engine has reached operating temperature or not. The effectiveness of hydraulic brakes can fall at high brake disc temperatures, since water in the brake fluid evaporates. High ambient temperatures combined with winter tires, or low ambient temperatures combined with summer tires, impair adhesion to the roadway and thus restrict the maximum force that can be transferred to the roadway. The tire pressure also affects the adhesion to the roadway.

The usage indicator can, for example, be a measure, in time or kilometers, for the period of operation of the vehicle system or of consumable material. Thus, for example, said tendency for the effectiveness of hydraulic brakes to fall at high temperatures depends heavily on the water content of the brake fluid. Brake fluid is fundamentally hygroscopic, which means that it absorbs water, so that corrosion does not result in the brake system. Its water content therefore correlates to its age. The usage indicator can, however, also be captured with a sensor system for example. Brake linings, for example, thus have a wear indicator.

In a further advantageous embodiment of the disclosure, at least one fault state of at least one vehicle system is captured with an on-board diagnostic system, OBD, and incorporated in the operator F. An electric steering can, for example, thus be fitted with a plurality of drives which cooperate under normal circumstances. If one of these drives fails, although the vehicle can still be steered, although this is only possible with a reduced force and speed. The driving behavior in limiting situations, for example, also changes, when an electronic stability program (ESP) is out of operation.

In a particularly advantageous embodiment, the operator W represents the effect of at least one external force on the vehicle, and/or at least one change in the condition of the roadway as external perturbations. Leaving accidents aside, these are the largest influencing factors. The effect of external force, for example from wind, directly influences the dynamic behavior. Thus it may be that a change in the steering angle is needed if a strong side wind is compensated for by steering against it, and the side wind suddenly drops because the vehicle has driven into the wind shadow of a truck. The change in the condition of the roadway can interfere with the transmission of force between the tires and the roadway, such as when the roadway is icy. The change in the condition of the roadway can however also for example lower the possible driving speed, perhaps because there is a threat of damage to the vehicle by driving too fast over a pothole.

The covariance propagation can take place according to any desired method. Tests by the inventor have found two methods to be particularly advantageous, in particular for the description of the vehicle dynamic behavior in combination with external perturbations.

In one particularly advantageous embodiment, a Jacobi matrix of the operator F is determined, and the covariance propagation comprises the application of the Jacobi matrix to the covariance tensor. The effect of the uncertainties of the individual state variables on the output of the operator that is applied to these state variables is captured particularly insightfully with the Jacobi matrix.

If, for example, $X_k$ is the state tensor at a time k, and $P_{X,k}$ is the associated covariance matrix at the time k, and if the operator W is an additive perturbation, then the continued development $P_{X,k+1}=P^*$ with the Jacobi matrix $J_{F,k}$ of the operator F at time k is calculated as $$P_{X,k+1}=J_{F,k}P_{X,k}J_{F,k}^T+Q_k,$$

wherein $Q_k$ is the covariance matrix of the operator W at time k.

No closed, model-based state-space representation is available for many control algorithms employed in vehicle technology. The Jacobi matrix J can, for example, be approximated using the first finite difference:

$$J_{F,ij}=\frac{F_i(X_k+h_je_j)-F_i(X_k)}{h_j}.$$

It is assumed here that F is a vector-valued function, and $F_i$ is the i-th component. $e_j$ is the j-th component of a unity vector in the direction j. $h_j$ is the chosen step width.

Similarly, using the first central finite difference, we obtain $$J_{F,ij}=\frac{F_i(X_k+h_je_j)-F_i(X_k-h_je_j)}{2h_j}.$$

The numerical approximation of the Jacobi matrix can be improved further through an increase in the order.

The covariance propagation with the Jacobi matrix offers the particular advantage that it can be implemented easily and effectively for linear systems, as well as promising an easily understood implementation for non-linear systems.

In a further advantageous embodiment of the disclosure, the covariance propagation from P to P* is carried out with the "unscented transform", UT. In this transformation, for example, the covariance at time k, $P_{X,k}$ is approximated through dynamically determined "sigma points". These "sigma points" are transformed with the non-linear operator F and then combined again with weighting in order to obtain the updated covariance $P^*=P_{X,k+1}$. The UT is known per se in the literature. What is new is the recognition of the inventor that the UT is particularly advantageous, especially in the context of the application presented here, namely the planning of trajectories: since no numerical approximation is required, a significant amount of computing time can be saved. Non-linear dynamics can, furthermore, be fully taken into account, since they do not fall prey to any approximations in the context of the UT.

In a further advantageous embodiment, the position of the vehicle is measured at a prescribed sampling rate. The continued temporal development P* of the covariance tensor P is updated at this sampling rate. In this way, the extrapolation P* of the covariance tensor always proceeds from the latest available information.

The measurement of the position of the vehicle is not restricted to determining the position with a satellite-based navigation system. The current position of the vehicle can, rather, also for example be measured in that, starting from a satellite-based determination of position at an initial point in time, it is updated with the aid of inertial navigation or other means.

Advantageously, the determined continued temporal development P* of the covariance tensor P extends over a period of time that is at least 50 times as long as the temporal spacing between two measurements of the position of the vehicle, that is for a plurality of seconds. Comparatively large amounts of calculated information are then immediately discarded again with each update. This "sacrifice", however, is balanced by the advantage that the prediction time is adequate for planning concrete driving maneuvers.

According to what has been described above, it is an important practical application of the method that the accuracy with which an intended trajectory y can be driven along by the vehicle can be incorporated from the beginning in the planning of this intended trajectory y. The disclosure thus relates to a method for planning an intended trajectory y for a vehicle, wherein the surroundings of the vehicle are captured with a physical sensor system and interpreted according to the applicable traffic rules. The intended trajectory y is determined subject to the boundary conditions of a safety and/or a tolerable risk of collision, wherein the accuracy with which the intended trajectory y can be driven along by the vehicle is determined in accordance with the method described, and is taken into account in the calculation of the risk of collision. A tolerable risk of collision is here specified in advance as an external parameter. In a probability-based context, collision freedom, i.e. a collision risk of precisely 0, is not generally achievable, since the probability of presence of arbitrary traffic participants at arbitrary locations, while it does converge towards the limiting value 0, never precisely adopts the value of 0.

As previously explained, it can be ensured in this way that only such intended trajectories y are selected which with the deviation to be expected in reality when actually driving are still safe and tolerable in terms of collisions.

The methods described can be implemented, entirely or partially, in software. This software can, for example, be sold as an update or upgrade to existing systems for trajectory following control, and is in this respect an independent product. The disclosure therefore also relates to a computer program with machine-readable instructions which, when executed on a computer and/or on a control device, cause the computer or the control device to execute a method according to the disclosure. The disclosure equally also relates to a machine-readable data carrier or a download product with the computer program.

Further measures that improve the disclosure are described in more detail below together with the description of the preferred exemplary embodiments of the disclosure with reference to figures.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
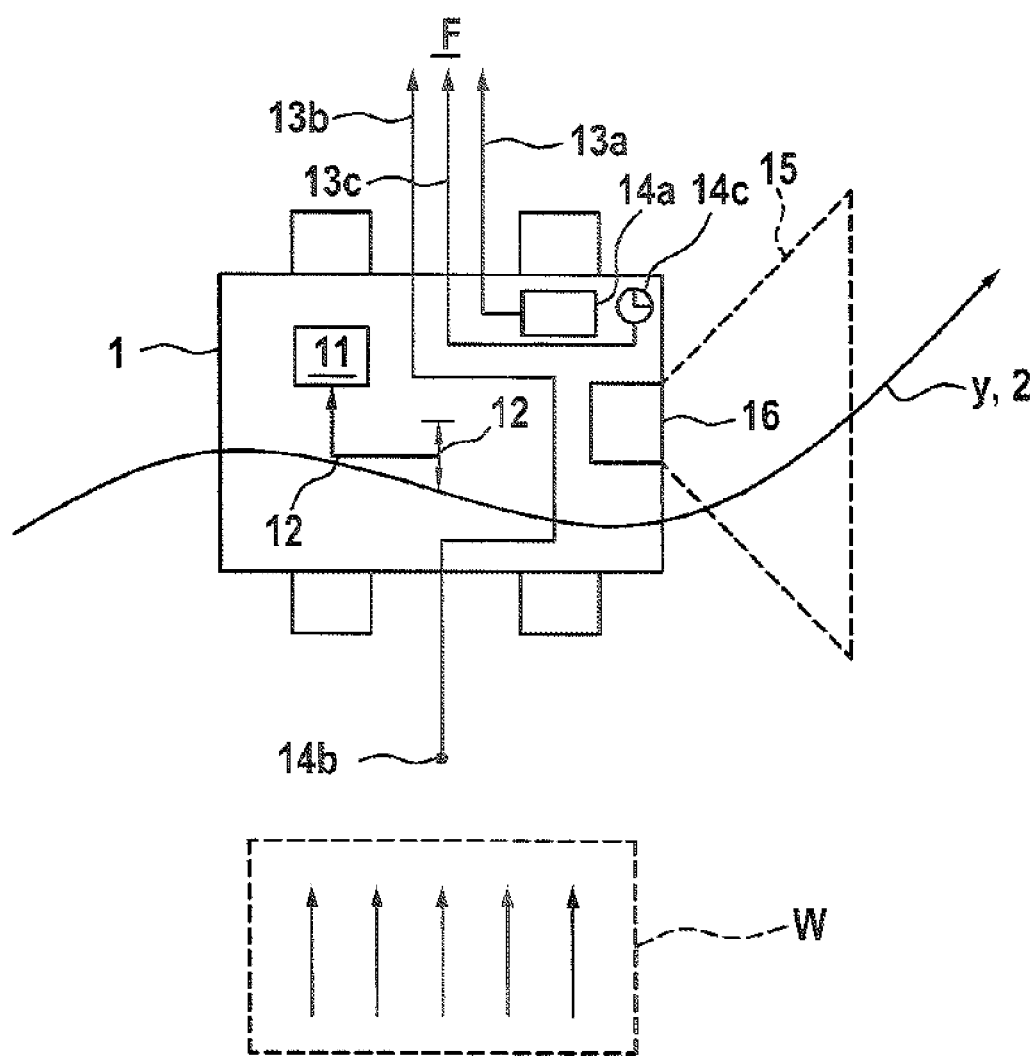
FIG. 1 shows an exemplary vehicle 1 and the significance of the operators F and W.

According to FIG. 1, the vehicle 1 should follow an intended trajectory y, 2. The vehicle 1 has a sensor system 16 that captures the surroundings 15. For the sake of clarity, only one capture region lying in front of the vehicle 1 is drawn as the surroundings 15 in FIG. 1. In a real vehicle, the entire surroundings would as a rule be sensed in every direction.

A control loop 11 is furthermore provided, which is designed to adjust the deviation 12 of the vehicle 1 from the intended trajectory y, 2. The deviation 12 which, realistically speaking, occurs in spite of the presence of the control loop 11, corresponds to the accuracy with which the vehicle 1 can drive along the prescribed trajectory y, 2. This accuracy will therefore also be identified with reference sign 12 below. For the sake of clarity here, only one lateral deviation from the trajectory y, 2 is drawn by way of example as the deviation 12 in FIG. 1. In a real vehicle it is generally required that at the time $t_k$ the vehicle is located at a trajectory point $\tau_k$. It follows from this that the coordinates also need to be made to match the intended trajectory y, 2 in the longitudinal direction and to adjust a corresponding longitudinal deviation.

The vehicle 1 has three sensors 14a-14c, drawn by way of example, which supply reference points in terms of the dynamic behavior of the vehicle 1, i.e. in terms of the possibilities of the vehicle 1, from which its kinematic behavior is to be changed. A first sensor 14a determines a physical state magnitude 13a of a vehicle system. A second sensor 14b determines a physical state magnitude 13b of the surroundings, such as the outside temperature. A third sensor 14c, perhaps an operating hours counter, determines a usage indicator 13c for the wear of at least one vehicle system or consumable material. The magnitudes 13a-13c are incorporated in the operator F which represents the dynamic behavior of the vehicle 1.

In particular, an original operator F, which represents the dynamic behavior of the vehicle 1 when in new condition, can in this way be continuously adjusted to the current situation.

The vehicle 1 is, in addition, also subject to external influences, in this case a wind field symbolized by parallel arrows. These external influences are incorporated in the operator W.

Figure 2:
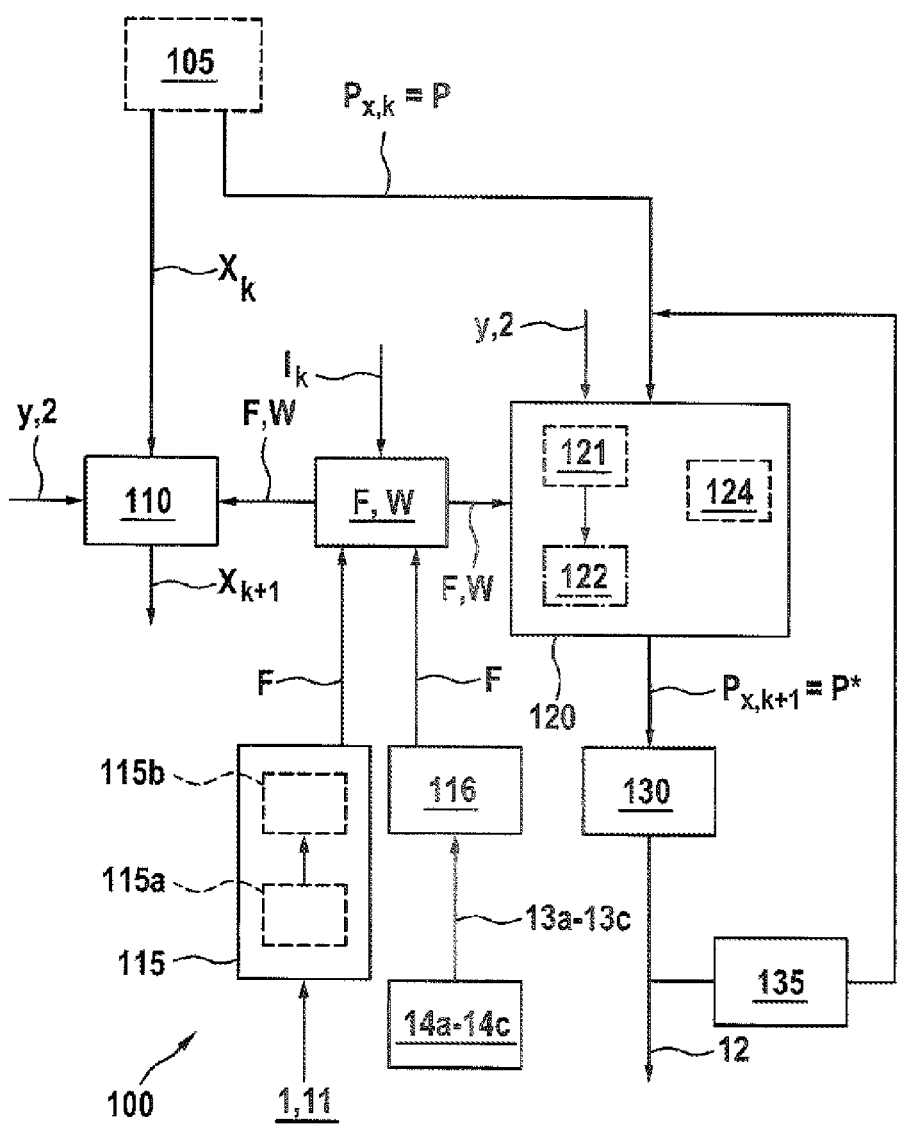
FIG. 2 shows an exemplary embodiment of the method 100.

FIG. 2 shows an exemplary embodiment of the method 100. The method assumes that in accordance with Block 105, the physical state of the vehicle 1 is represented by a state tensor X, whose uncertainty at an initial point in time (k, in the discrete-time representation) is known in the form of a covariance tensor $P_{X,k}=P$.

In accordance with Step 110, the continued temporal development of the state tensor $X_k$ at time k to a state tensor $X_{k+1}$ at time k+1 is modeled through application of the operator F to a combination of X with the intended trajectory y, 2 and the subsequent application of the operator W to the result. The operators F and W can originate from any desired source. In particular, it is possible to check, through a comparison of the continued temporal development of the state tensor X with the actual dynamic behavior of the vehicle 1, whether the currently used operators F and W are sufficiently realistic.

The operator F can, for example, be determined in accordance with Step 115 through modeling the behavior of the combination of the vehicle 1 and the control loop 11 contained in it, which is responsible for driving along the intended trajectory y, 2. If a fleet of a plurality of vehicles 1 is available, this can be further refined in that, in accordance with Step 115a, the actual behavior is analyzed for the plurality of vehicles 1, and, in accordance with Step 115b, a pool of the information thereby obtained is formed, in order to reach an operator F common for all vehicles 1.

Alternatively, or also in combination, the magnitudes 13a-13c obtained from the sensors 14a-14c presented in FIG. 1 can be incorporated in the operator F in accordance with Step 116 in order to adjust this continuously and for the specific vehicle.

The operator F can, finally, also depend on the vector lk which represents internal parameters.

The original covariance $P_{X,k}=P$ is updated in accordance with Step 120 through covariance propagation with the operators F and W to form a new covariance $P_{X,k+1}=P^*$. This can, for example, be done in that, in accordance with Step 121, a Jacobi matrix of the operator F is determined, and this Jacobi matrix is applied, in accordance with step 122, to the covariance tensor P. The unscented transform, UT, can be applied in accordance with step 124 as an alternative.

Regardless of the way in which the new covariance $P_{X,k+1}=P^*$ is obtained, the accuracy 12 with which the vehicle 1 can drive along the intended trajectory y, 2 is evaluated from this in accordance with Step 130.

Figure 3:
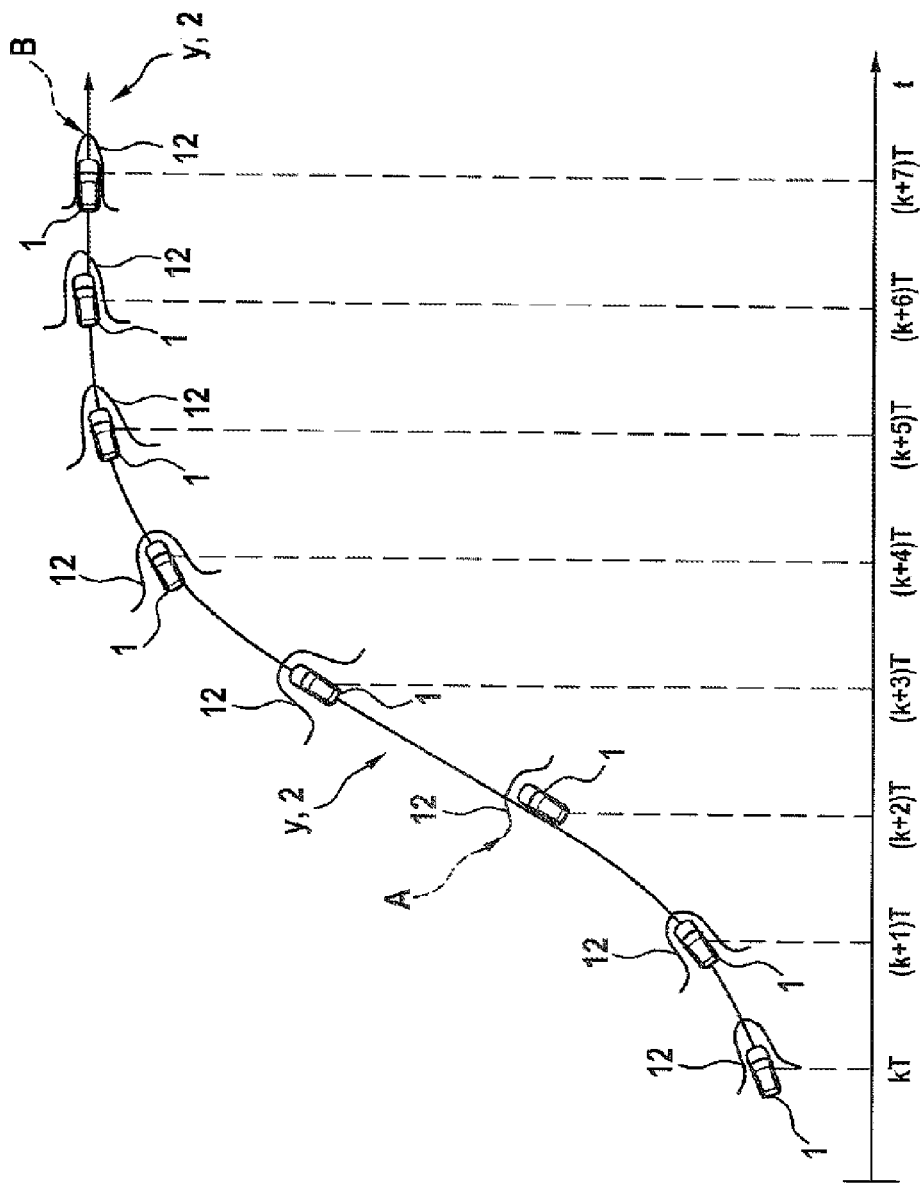
FIG. 3 shows an exemplary change to the accuracy 12 in the course of an intended trajectory y, 2.

FIG. 3 illustrates by way of example how the achievable accuracy 12 can change markedly along an intended trajectory y, 2. The vehicle 1 is plotted along an exemplary intended trajectory y, 2 a plurality of times at respective positions that it reaches at times t each of which is incremented by an integral multiple of the time unit T with respect to the initial time point k*T. The accuracy 12 determined with the method 100 is plotted in each case in the form of a frequency distribution of the deviations from the intended trajectory y, 2. A numerical value for the accuracy 12 can, for example, be determined from a width of this frequency distribution. Similarly to FIG. 1, this is illustrated in FIG. 3 for the transverse deviation by way of example, for reasons of clarity. Analogous considerations apply to the longitudinal deviation.

The tendency for the intended trajectory y, 2 to be driven along with a lower accuracy as the current change in direction at the respective point is more pronounced can be seen in FIG. 3. The physical reason for this is that when a change in direction is pronounced, a large number of forces are active, each of which is subject to a corresponding uncertainty (see the extreme example identified with A in FIG. 3). In contrast, the accuracy is best in the case of steady movement along a straight section of the intended trajectory y, 2 (see the extreme example identified with B in FIG. 3). The accuracy can, however, also fall significantly on a straight section of the intended trajectory y, 2 if the vehicle 1 is strongly accelerated or decelerated there, since a longitudinal deviation from the intended trajectory y, 2 can arise through this driving maneuver.

Figure 4:
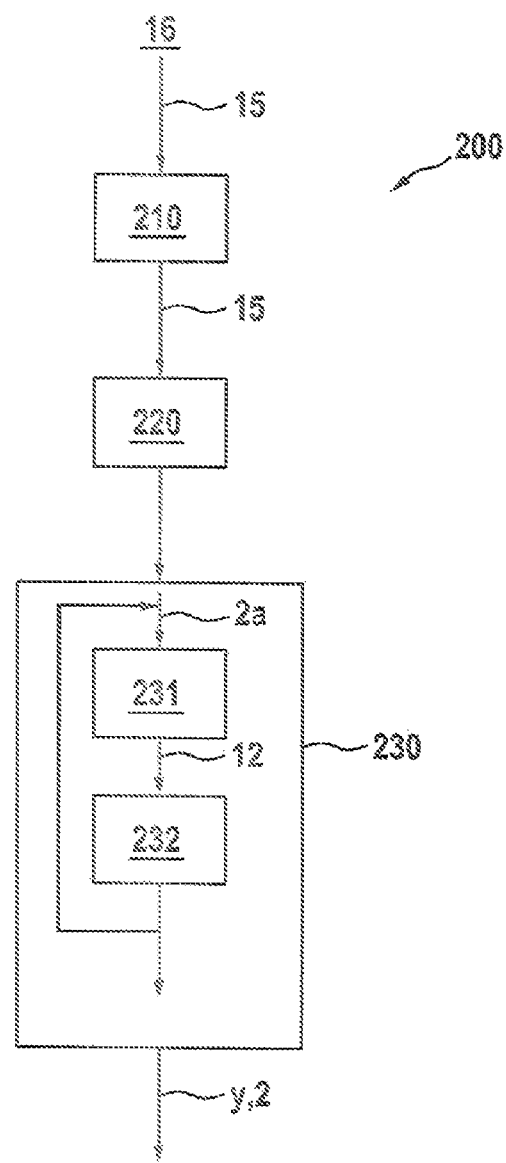
FIG. 4 shows an exemplary embodiment of the method 200

FIG. 4 shows an exemplary embodiment of the method 200. The sensor system 16 of the vehicle 1 accepts information from the surroundings 15 of the vehicle 1 which is acquired in accordance with Step 210. This information is interpreted in the light of the applicable traffic rules in accordance with Step 220. Subject to the boundary condition of a safety and/or a tolerable risk of collision, an intended trajectory y, 2 is determined for the vehicle 1 in accordance with Step 230.

Within Step 230 a potential intended trajectory 2a is now evaluated in accordance with step 231 with the method 100 in terms of the accuracy 12 with which it can be driven along by the vehicle 1. This accuracy 2 is employed in the examination of this potential intended trajectory 2a for safety or for a tolerable risk of collision in step 232. Depending on the result of this examination, the potential intended trajectory 2a can be output as the final intended trajectory y, 2, or a new potential intended trajectory 2a can be tested.

What is claimed is:

1. A method for determining an accuracy with which a vehicle can drive along a prescribed intended trajectory y, the method comprising:

representing a physical state of the vehicle by a state tensor X, the uncertainty of which is known at an initial point in time in a form of a covariance tensor P;

modeling a continued temporal development of the state tensor X through an application of a first operator F, which represents a dynamic behavior of the vehicle, to a combination of the state tensor X and the prescribed intended trajectory y, and through a subsequent application of a second operator W, which represents external perturbations, to a result of the application of the first operator F;

determining a continued temporal development P* of the covariance tensor P through a covariance propagation with the first operator F and the second operator W; and determining a future accuracy with which the prescribed intended trajectory y can be driven along based on the continued temporal development P*.

2. The method according to claim 1, wherein the state tensor X contains a current position of the vehicle and a set of further magnitudes that represents a set of kinetic and potential energies linked to the dynamic behavior of the vehicle.

3. The method according to claim 1 further comprising:

choosing a vehicle that is fitted with a control loop for automatically driving along the prescribed intended trajectory y; and determining the first operator F by modeling a behavior of a combination of the vehicle and the control loop.

4. The method according to claim 3, wherein the first operator F additionally represents at least one of uncertainties and inaccuracies to which the modeling of the behavior is subject.

5. The method according to claim 3 further comprising:
determining an actual behavior of the combination of the vehicle and the control loop on a plurality of vehicles; and
determining a common first operator F for the plurality of vehicles based on information related to the actual behavior of the combination of the vehicle and the control loop on the plurality of vehicles.

6. The method according to claim 1 further comprising:
capturing, with at least one sensor, and incorporating in the first operator F, at least one of (i) at least one physical state magnitude of one of the vehicle and at least one vehicle system, (ii) at least one physical state magnitude of a surroundings, and (iii) at least one usage indicator for a wear of one of the at least one vehicle system and a consumable material.

7. The method according to claim 6 further comprising:
choosing, as the physical state magnitude, at least one of: (i) a weight of the vehicle, (ii) a spatial weight distribution of the vehicle, (iii) at least one temperature, and (iv) at least one pressure.

8. The method according to claim 1 further comprising:
capturing, with an on-board diagnostic system, and incorporating in the first operator F, at least one fault state of at least one vehicle system.

9. The method according to claim 1, wherein the second operator W represents at least one of (i) an effect of at least one external force on the vehicle and (ii) at least one change in a condition of a roadway as external perturbations.

10. The method according to claim 1 further comprising:
determining a Jacobi matrix of the first operator F,
wherein the covariance propagation includes an application of the Jacobi matrix to the covariance tensor P.

11. The method according to claim 1 further comprising:
choosing the unscented transform UT for the covariance propagation from P to P*.

12. The method according to claim 1 further comprising:
measuring a position of the vehicle at a prescribed sampling rate; and
updating the continued temporal development P* of the covariance tensor P at the prescribed sampling rate.

13. The method according to claim 12, wherein the determined continued temporal development P* of the covariance tensor P extends over a period of time that is at least fifty times as long as a temporal spacing between two measurements of the position of the vehicle.

14. A method for planning an intended trajectory y for a vehicle, the method comprising:
capturing, with a physical sensor system, a surroundings of the vehicle;
interpreting the surroundings of the vehicle according to applicable traffic rules;
determining the intended trajectory y subject to boundary conditions of at least one of a safety risk of collision and a tolerable risk of collision;
determining an accuracy with which the vehicle can drive along the intended trajectory y, which is taken into account in an examination of the tolerable risk of collision, the accuracy being determined by:
representing a physical state of the vehicle by a state tensor X, the uncertainty of which is known at an initial point in time in a form of a covariance tensor P;
modeling a continued temporal development of the state tensor X through an application of a first operator F, which represents a dynamic behavior of the vehicle, to a combination of the state tensor X and the prescribed intended trajectory y, and through a subsequent application of a second operator W, which represents external perturbations, to a result of the application of the first operator F;
determining a continued temporal development P* of the covariance tensor P through a covariance propagation with the first operator F and the second operator W; and
determining a future accuracy with which the prescribed intended trajectory y can be driven along based on the continued temporal development P*.

15. A non-transitory computer program containing machine-readable instructions for determining an accuracy with which a vehicle can drive along a prescribed intended trajectory y, which, when executed on at least one of a computer and a control device, cause the at least one of the computer and the control device to:
represent a physical state of the vehicle by a state tensor X, the uncertainty of which is known at an initial point in time in a form of a covariance tensor P;
model a continued temporal development of the state tensor X through an application of a first operator F, which represents a dynamic behavior of the vehicle, to a combination of the state tensor X and the prescribed intended trajectory y, and through a subsequent application of a second operator W, which represents external perturbations, to a result of the application of the first operator F;
determine a continued temporal development P* of the covariance tensor P through a covariance propagation with the first operator F and the second operator W; and
determine a future accuracy with which the prescribed intended trajectory y can be driven along based on the continued temporal development P*.

* * * * *